(12) United States Patent
Shuler

(10) Patent No.: US 6,363,678 B1
(45) Date of Patent: Apr. 2, 2002

(54) COUPLING CONNECTOR AND METHOD

(76) Inventor: Jay L. Shuler, 20646 Clarice Ave., Prairie View, IL (US) 60069

( * ) Notice: Subject to any disclaimer, the term of this patent is extended or adjusted under 35 U.S.C. 154(b) by 0 days.

(21) Appl. No.: 09/544,074

(22) Filed: Apr. 6, 2000

(51) Int. Cl.⁷ ................................................. E04C 2/38
(52) U.S. Cl. .................... 52/656.9; 52/655.2; 52/63; 403/340
(58) Field of Search ................. 52/63, 74, 82, 52/72, 202, 655.1, 655.2, 656.9; 135/89; 403/339, 340, 341, 334; 240/226.4

(56) References Cited

U.S. PATENT DOCUMENTS

| | | | |
|---|---|---|---|
| 1,482,944 A | * | 2/1924 | Russ |
| 2,863,685 A | * | 12/1958 | Boyce |
| 3,720,438 A | | 3/1973 | Johnson et al. |
| 3,934,924 A | | 1/1976 | Diliberti |
| 4,175,576 A | | 11/1979 | Iby |
| 4,186,758 A | | 2/1980 | Bridgman |
| 4,726,153 A | | 2/1988 | Adler et al. |
| 5,148,640 A | | 9/1992 | Reilly, Sr. |
| 5,176,406 A | | 1/1993 | Strafhan |
| 5,192,111 A | | 3/1993 | Hanemaayer |
| 5,381,844 A | | 1/1995 | Struben |
| 5,419,309 A | * | 5/1995 | Davis ......................... 405/209 |
| 5,439,309 A | * | 8/1995 | Raz ............................ 403/316 |
| 5,579,797 A | | 12/1996 | Rogers |
| 5,607,250 A | | 3/1997 | Tatterson et al. |
| 5,660,425 A | | 8/1997 | Weber |

* cited by examiner

Primary Examiner—Yvonne M. Horton
(74) Attorney, Agent, or Firm—Charles F. Meroni, Jr.; Meroni & Meroni, P.C.

(57) ABSTRACT

The present invention concerns a connector that comprises a coupling comprising a first portion, a second portion that is located adjacent the first portion, a top surface, and a bottom planar surface that is located opposite the top surface. The bottom planar surface is continuous through the first portion and the second portion. The top surface is substantially planar through the first portion while defining a shape through the second portion that is asymmetrical in two dimensions about a set of perpendicular axes centered in the second portion. The present invention also provides a connection system, a portable assembly, and a method of assembling a portable structure that utilizes the coupling.

29 Claims, 9 Drawing Sheets

COUPLING CONNECTOR AND METHOD

BACKGROUND OF THE INVENTION

1. Field of the Invention

The present invention relates to connection devices for portable assemblies. More specifically, the present invention is primarily intended as a coupling connection and portable assembly for use with stand-alone and supported structures.

2. Description of the Related Art

The assemblage of portable structures and the like serve an important purpose in modem life. For years now, the portable structures have found usage in many fields, including but not limited to camping, ranching, farming, gardening, and recreating. These portable structures have included fences, tents, awnings, walls, swimming pools, and so forth.

In an age of advances, a premium has been laid on portability and durability of these different structures. In particular, the importance of simple, strong, and durable connections cannot be overstated. The structure is only as good as the strength of its parts and their connections. While manufacturers have improved materials, artisans have sought to prepare and produce strong, lighter, and more durable portable structures, such as the awning and the tent. Moreover, different connections and connectors have been presented, used, and improved upon in the attempt to meet the needs of the purchasing public.

For example, U.S. Pat. No. 5,660,425 discloses a Portable Apparatus For Providing Shelter Adjacent A Motor Vehicle. This apparatus includes a collapsible frame assembly having a collapsible main frame assembly and leg mechanism. At least one clamp assembly securely attaches the main frame assembly to at least a portion of a motor vehicle and the main assembly supports a main cover. The vehicle's mass and stability provide structural integrity to the assembly. However, the frame assembly of the '425 Patent is connected together by fasteners such as screws, rivets, glues, and/or crimping. Such fastening and fasteners do not allow for quick connection and disconnection of the various parts of the frame assembly as is required for modem portability. Moreover, attachment of the frame parts using such fasteners can require perfect preconnection alignment of the parts to be aligned as well as usage of tools and costly manufacturing processes.

Other camping apparatus, such as the Camping Apparatus for Van-Type Vehicle disclosed in U.S. Pat. No. 3,934,924, not only clamp on to the vehicle, but they rely upon mating female and male channels and pin fasteners for securement of the mated connections. This type of connection, while potentially requiring less time to connect then the '425 device, does not allow for less than perfect alignment for connection, nor does this type of connection allow rotation of the connectors during the connection process for allowing ease of connection in less than desirable terrain and circumstance.

Finally, the Quick Connect Coupling of U.S. Pat. No. 5,607,250 discloses a coupling comprising a male and female half that are coupled together in axial alignment. A keying portion is provided at one end of the male half which has at least one keying element with a bearing surface. The female half has an opening located on one side with recesses therein shaped for location of the keying element. The opening allows the keying portion to engage the opening in a direction that is transverse to the aligned axis and the recess has abutment surfaces against which the bearing surfaces locate during engagement of the keying portion within the recess. A locking member and a sleeve are secured to the female half to cover the opening and to secure the male half therein. However, operation of the sleeve and locking member require more than simple axial movement as the '250 device requires the additional actions of actuating the location pin and rotating and sliding the sleeve and locking member toward the male half In addition the '250 device requires usage of a female half and a male half in order to make the connection rather than use of a single universal connector. The '250 device also requires costly manufacturing of the 3-dimensional circular surfaces on the male and female halves and the working parts.

It is therefore important and necessary that a coupling connector be developed that is a single universal connector and provides a quick-release connection that is both easy to engage and simple to operate. The coupling connector would provide ease of connection without requiring perfect alignment, would be structurally strong and sound, and would be rotatable in a 360-degree direction for ease of connection. It is also desirable that the coupling connector be inexpensive, simple to manufacture, require only simple tooling, and be capable of use in the assembly of both stand-alone and supported structures.

Other objects of my invention, as well as particular features, elements, and advantages thereof, will be elucidated in, or apparent from, the following description and the accompanying drawing figures.

SUMMARY OF THE INVENTION

The present invention provides a connector or device for connecting stand-alone and supported structures, such as tents, awnings, walls, and buildings, and provides a method of using the connector for assembling a portable structure. According to the present invention a connector is provided and comprises a coupling comprising a first portion, a second portion that is adjacent the first portion, a top surface, and a bottom planar surface that is located opposite the top surface. The bottom planar surface is continuous through the first portion and the second portion and the top surface is substantially planar through the first portion. However, a key feature of the present invention is that the top surface defines a shape through the second portion that is asymmetrical in two dimensions about a set of perpendicular axes that are centered in the second portion. The shape then can have various shapes, such as sinusoidal, square wave, and raised arcuate shapes.

The present invention also provides a connection system that comprises a pair of mutually compatible couplings. Each coupling comprises a first portion, a second portion that is also adjacent the first portion, a top surface, and a bottom planar surface located opposite the top surface. The bottom planar surface is continuous through the first portion and the second portion and the top surface is substantially planar through the first portion while defining a shape through the second portion that is asymmetrical in two dimensions about a set of perpendicular axes that are centered in the second portion. The couplings can be asymmetrically aligned with one another for removably connecting the couplings and for assembling and disassembling the portable structures.

As for the portable assembly, the present invention provides a portable assembly comprising a plurality of elongated support members and a plurality of block support structures. Each elongated support member comprises opposite ends and a coupling located at each of the opposite ends.

Each coupling comprises a first portion, a second portion that is located adjacent the first portion, a top surface, and a bottom planar surface that is located opposite the top surface. The bottom planar surface is continuous through the first portion and the second portion. The top surface is substantially planar through the first portion while defining a shape through the second portion that is asymmetrical in two dimensions about a set of perpendicular axes that are centered in the second portion. The first portion of each coupling of the elongated support members further comprises a sleeve for concentrically enclosing the first portion and the second portion and the sleeve is attached to and actuated by a spring attached to the first portion.

The plurality of block support structures are provided for removable attachment to the plurality of elongated support members. Each block support structure comprises adjacent, mutually perpendicular connection surfaces and at least one coupling rotatably attached to at least one of the adjacent, mutually perpendicular connection surfaces. Each coupling comprises a first portion that is rotatably attached to the corresponding connection surface of the block support structure, a second portion located adjacent the first portion, a top surface, and a bottom planar surface located opposite the top surface. The bottom planar surface is continuous through the first portion and the second portion and the top surface is substantially planar through the first portion while defining a shape through the second portion that is asymmetrical in two dimensions about a set of perpendicular axes that are centered in the second portion. The couplings of the plurality of elongated support members and the plurality of block support structures can be asymmetrically aligned with one another for removably connecting the corresponding couplings and for constructing the portable assembly. The sleeve can concentrically enclose the couplings.

Finally, the present invention also provides a method of assembling a portable structure. The method comprises the acts of: first, providing a plurality of elongated support members with each elongated support member comprising at least one coupling that comprises a first portion having a sleeve, a second portion adjacent the first portion, and a top surface defining a shape through the second portion that is asymmetrical in two dimensions about a set of perpendicular axes centered in the second portion. The sleeve can concentrically enclose the first portion and the second portion. The next act is providing a plurality of block support structures, with each block support structure comprising at least one coupling that comprises a first portion rotatably attached to the corresponding block support structure, a second portion adjacent the first portion, and a top surface defining a shape through the second portion that is asymmetrical in two dimensions about a set of perpendicular axes centered in that second portion. Next is pulling the sleeve and compressing a spring on at least one of the elongated support members for exposing at least the second portion located therein followed by positioning the corresponding exposed second portion of the coupling of the elongated support member adjacent the second portion of the coupling of one of the block support structures. The method continues with rotating the second portion of the coupling of one of the block support structures and asymmetrically aligning the second portion of the block support structure with the exposed second portion of the elongated support member. Then mating the asymmetrically aligned top surfaces of the couplings followed by releasing the sleeve for actuating and releasing the spring. Finally, the method can conclude with concentrically enclosing the first portion and the second portion of the corresponding elongated support member and at least the second portion of the corresponding block support structures for completion of the connection.

In another method of assembling a portable structure, the method comprises the acts of: first, providing a plurality of elongated support members including at least one coupling and a sleeve and then, providing a plurality of block support structures including at least one coupling. Next is pulling the sleeve and compressing a spring on at least one of the elongated support members for exposing a two dimensional asymmetric shaped portion of the coupling located therein. Thereafter is positioning the exposed two dimensional asymmetric shaped portion of the coupling of the elongated support member adjacent a substantially similar two-dimensional asymmetric shaped portion of the coupling of one of the block support structures. The next act is rotating the substantially similar two dimensional asymmetric shaped portion of the coupling of the block support structure and asymmetrically aligning the substantially similar two dimensional asymmetric shaped portion of the block support structure with the exposed two dimensional asymmetric shaped portion of the elongated support member. The method continues with connecting the asymmetrically aligned two dimensional asymmetric shaped portions of the couplings whereafter the act is releasing the sleeve for actuating and releasing the spring. Finally, the method can conclude with concentrically enclosing at least the connected two dimensional asymmetric shaped portions of the corresponding elongated support member and the corresponding block support structures for completion of the connection and for assembling the portable structure. The method also comprises the acts of disassembling the portable structure.

Hence, the present invention provides a coupling connector that is a single universal connector that provides a quick-release connection that is both easy to engage and simple to operate. The coupling connector of the present invention also provides ease of connection without requiring perfect alignment, is structurally strong and sound, and is rotatable in a 360-degree direction for ease of connection. The coupling connector can also be inexpensive, simple to manufacture, require only simple tooling, and can be used in the assembly of both stand-alone and supported structures.

DESCRIPTION OF THE DRAWINGS

Other features of my invention will become more evident from a consideration of the following detailed description of my patent drawings, as follows.

DETAILED DESCRIPTION OF THE PREFERRED EMBODIMENT

Figure 1:
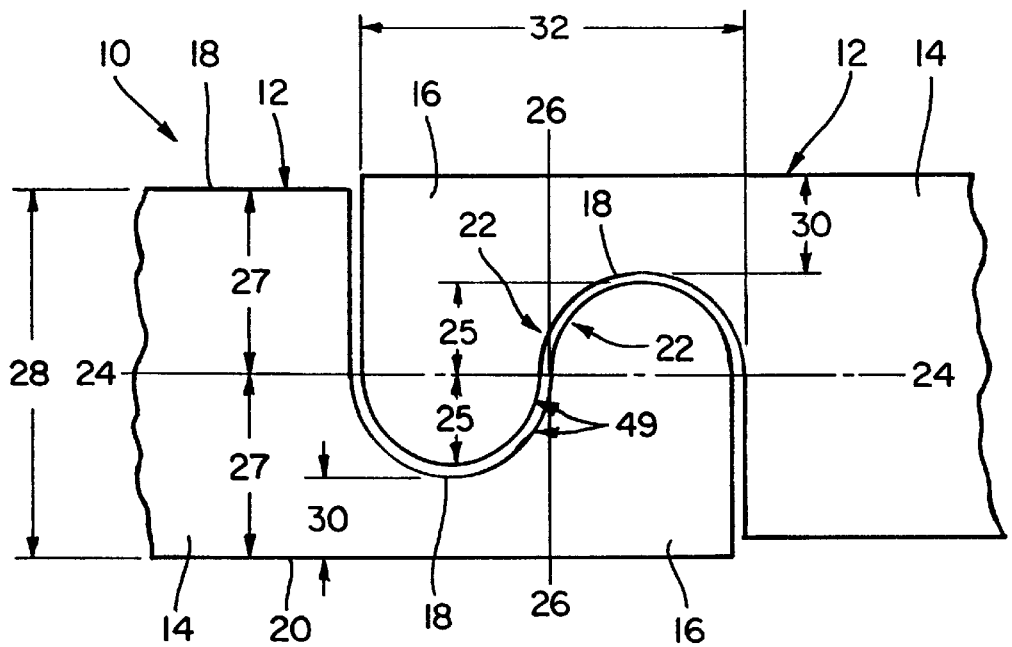
FIG. 1 is a cross-sectional view of couplings of the present invention.
Figure 3:
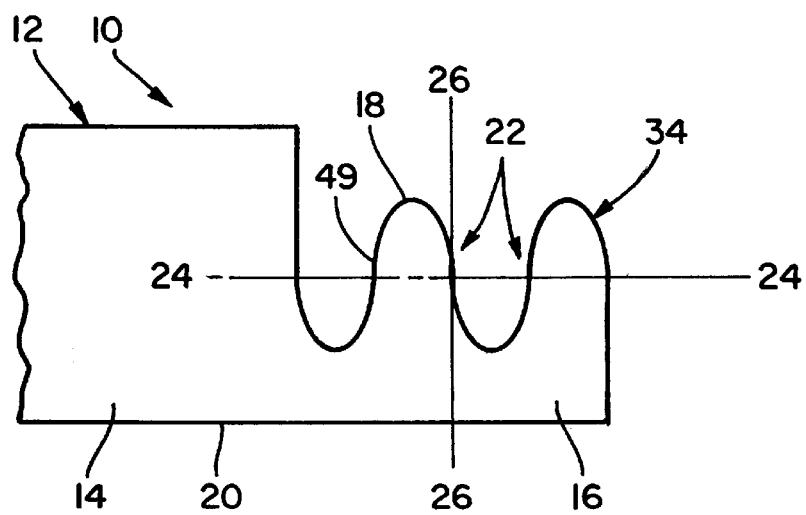
FIG. 3 is a cross-sectional view of an embodiment of the coupling of the present invention showing a sinusoidal shape.
Figure 2A:
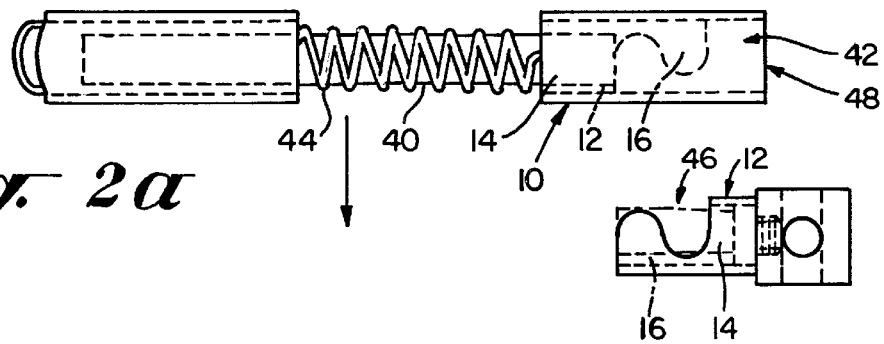
FIG. 2 is a diagrammatic view of the operation of the coupling of the present invention.
Figure 2B:
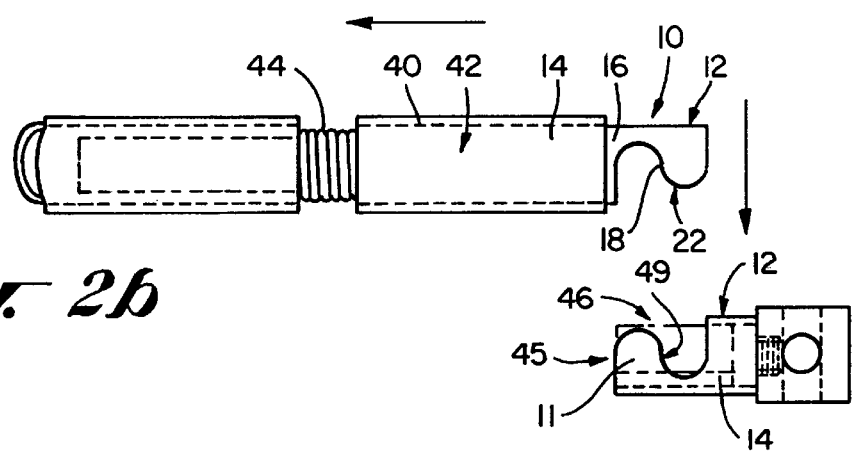
Figure 2C:
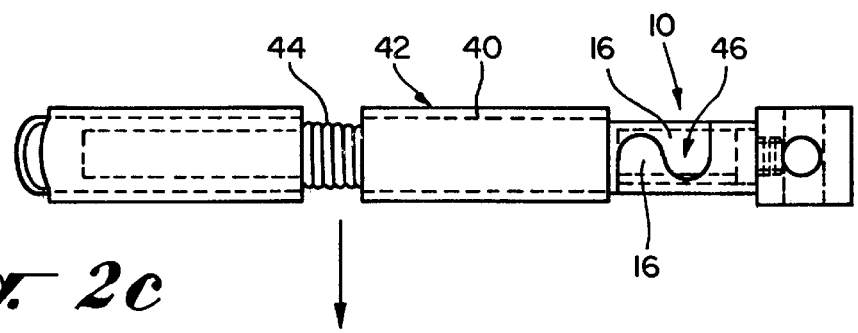
Figure 2D:
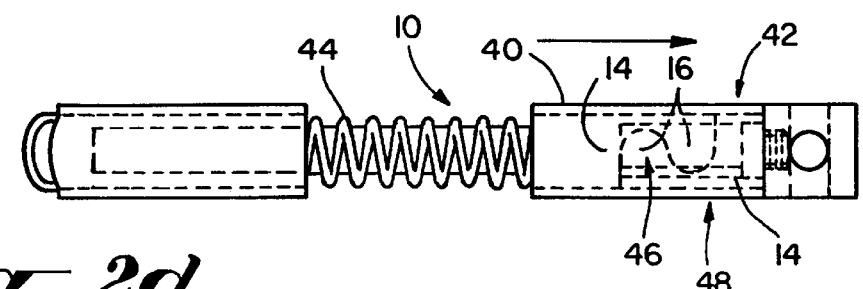

Referring now to the drawings, the present invention concerns a coupling connector and usage of the coupling for portable assemblies, illustrated by way of example in FIGS. 1–15. It is not intended that the present invention be limited solely to coupler connectors for portable assemblies, such as fences, tents, awnings, and buildings, rather it is intended that the scope of the present invention also includes means for assembling and securing of other portable assemblies (i.e. stand-alone and supported structures), such as swimming pools, walls, and the like.

As is illustrated in FIGS. 1–5, the connector 10 comprises a coupling 12 that comprises a first portion 14, a second portion 16 that is located adjacent the first portion, a top surface 18, and a bottom planar surface 20 that is located opposite the top surface of the coupling. The bottom planar surface 20 is continuous through the first portion 14 and the second portion 16. However, as is important to the function of the present invention, the top surface 18, while being substantially planar through the first portion 14, defines a shape 22 through the second portion 16.

The shape 22 is an important feature of the present invention, and as is shown in FIGS. 1–5 in particular, the shape 22 is defined through the second portion 16 of the coupling 12 and is asymmetrical in two dimensions about a set of perpendicular axes 24, 26 that are centered in the second portion. The perpendicular axes 24, 26 may be mathematically represented as the x-axis 24 and the y-axis 26, for example. As is illustrated in FIG. 1, the x-axis 24 can be a longitudinal axis that bisects both the first portion and the second portion and can be equidistant from the top surface and the bottom planar surface through the first portion. The y-axis 26 may then bisect the x-axis in the second portion and run orthogonal to it. The shape 22 then has an amplitude 25 that is measured perpendicular from the longitudinal axis 24 and has a first measurement value 25 that is less than a second measurement value 27 that is measured from the longitudinal axis to either the top surface 18 or the bottom planar surface 20 of the first portion 14.

The asymmetrical nature of the shape 22 and its functional geometry provide a particular proportion or configuration that can both increase the tensile strength (i.e. resistance to pulling the connector itself apart along the longitudinal axis 24) and increase the axial stability (i.e. resistance to pulling the connected connectors apart by rotation and the like about the axes 24, 26) of the connector 10. The asymmetrical nature of the shape also can provide improved connection edges for easily connecting two couplings together in a snug fit and an axially strong connection that can resist movement along the longitudinal axis 24 once the connection is made. This axial strength (i.e. tensile strength) then increases the ultimate strength of the portable structure using the connector 10. Some leeway in the fit of the connectors can be allowed for ease of assembly without sacrificing strength of the connection.

In design and proportion, a first thickness 28 is measured from the top surface 18 to the bottom planar surface 20 of the first portion 14 while a second thickness 30 is measured from the amplitude 25 to the bottom planar surface 20. The second thickness may then be sized and proportioned relative to the first thickness (i.e. as a percentage of the first thickness), as is shown in FIG. 1, for strengthening the tensile strength of the second portion or alternatively for increasing the axial stability of the connector 10. For example, as the second thickness is increased relative to the first thickness, the tensile strength increases while the axial stability decreases. Hence, a second thickness must be sized and proportioned relative to the first thickness so as to balance and achieve both increased tensile strength and maximized axial stability. Moreover, the second portion 16 must be longitudinally sized 32 (i.e. relative to the first thickness) so as to also balance increased tensile strength with maximized axial stability.

Figure 4:
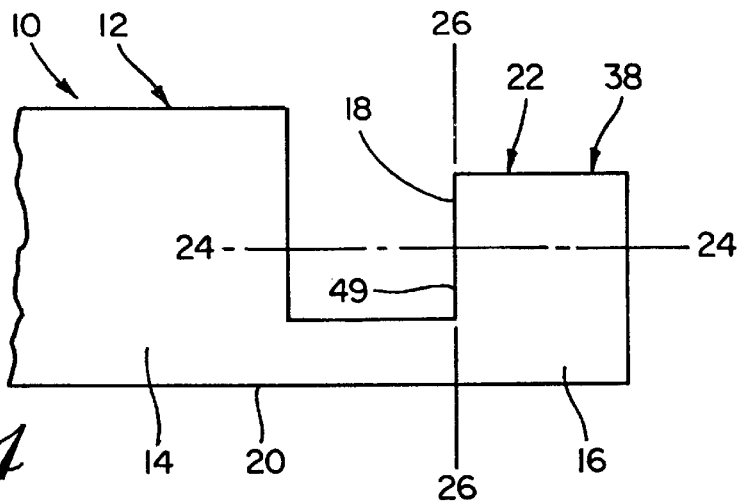
FIG. 4 is a cross-sectional view of another embodiment of the coupling of the present invention showing a square wave shape.
Figure 4A:
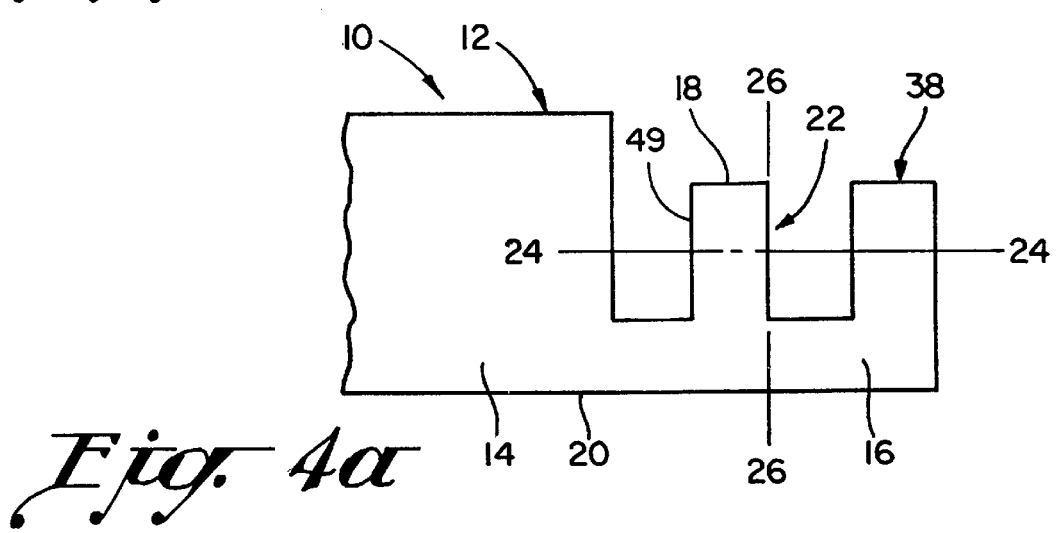
FIG. 4a is a cross-sectional view of the second embodiment of the coupling of the present invention showing a repeated square wave shape.
Figure 5:
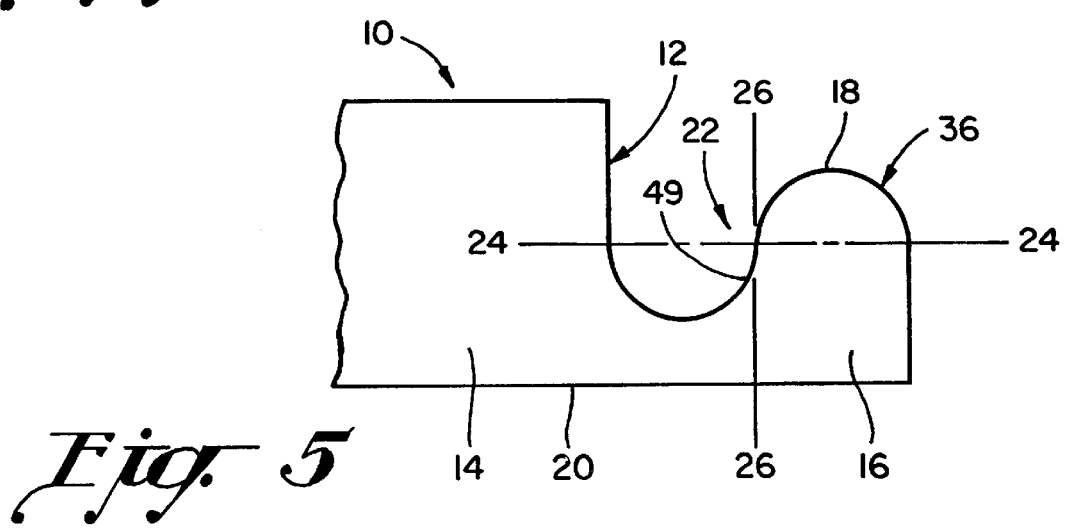
FIG. 5 is a cross-sectional view of still another embodiment of the coupling of the present invention showing a raised arcuate shape.

As is illustrated in FIGS. 1–5, the shape 22 of the top surface 18 of the second portion 16 can be that of many geometric shapes or can be defined by many mathematical equations or functions as seen in the plane of the axes 24, 26. For example, the shape can be sinusoidal 34 (FIG. 3), a raised arcuate or parabolic shape 36 (FIG. 5), or a square wave type shape 38 (FIGS. 4 and 4a) that could also be defined mathematically as a step function. In addition, as FIGS. 1–5 show, the shape can have one or more raised edges 49 for increasing the axial stability of the connection. Moreover, each connector 10 can have a cross section or width dimension, as measured along an axis perpendicular to the axes 24, 26, that is sized and configured for use, strength, and appearance. For example, the cross section can be round, square, elliptical, and so forth. It is contemplated that the first portion 14 and the second portion 16 may also have different cross sections in a hybrid form, for example, with one portion being circular and the other square.

The first portion 14, as illustrated in FIG. 2, can also have an elongated section 40 extending opposite the second portion 16. A sleeve 42 can then concentrically enclose both the first portion 14 and the second portion 16 of the connector 10, including the elongated section 40 to which it is attached and axially actuated by a spring 44. As is shown diagrammatically in FIG. 2, the sleeve and spring work to concentrically enclose at least the second portion 16 of a second connector 46, as well as the connector's 10 first and second portions 14, 16, when the connector 10 and second connector 46 are asymmetrically aligned and connected together at the second portions 16. The spring can be configured to bias the sleeve in the concentrically enclosed position about the first and second portions 14, 16 for adding an additional means of securing and maintaining the connection of the couplings 12, especially when the couplings 12 are approximately the same shape and type of connector (i.e. are mutually compatible). Moreover, the couplings 12 of the present invention can function together because the present invention contemplates that a single, universal connector 10 can be used throughout the connection areas of portable assemblies. Such universality is preferred and presents an advantage of the present invention.

Therefore, FIG. 2 shows the simple operation of the connector 10 of the present invention and the quick-connect and quick-release processes involved. As stated above, in its free state, the spring 44 biases the sleeve 42 towards a closed or concentrically enclosed position 48. The sleeve 42 of the connector 10 can then be pressed against the spring 44, compressing the spring and exposing the second portion 16 of the connector 10 that was located thereunder. Next, the second portion and shape 22 of the connector 10 can be asymmetrically aligned with the second portion 16 of the second connector 46. The second connector 46 can be capable of rotation 45 about its attachment to parts of the portable assembly, as will be described in detail below. This rotatable attachment can allow the second connector 46 the ability to rotate 360 degrees or as is necessary. The advantage is that the connector 10 will not then need to be perfectly aligned to connect with the second connector 46.

Once the sleeve 42 is pulled back and the connectors 10, 46 are asymmetrically aligned with one another, the shapes 22 of the connectors may then be attached with the raised edges 49 placed adjacent or against each other, shape matching or approximating shape. Then, the sleeve 42 is released and the spring 44 is actuated and closes the sleeve over both the first and second portions 14, 16 of the connector 10 and at least the second portion 16 of the second connector 46 for completion of the connection.

In an operation just as simple as the connection, disconnection of the connectors 10, 46 of the present invention involves pulling the sleeve 42 back, removing the aligned connectors 10, 46 from one another, and then releasing the sleeve 42 again. The sleeve 42 is then closed over the first and second portions 14, 16 of the connector 10 by action of the spring 44. In this manner, assembly and disassembly, using the connectors of the present invention, is simple, quick, and economical.

In application and operation, the connector 10 of the present invention can be combined with many different parts of an assembly, such as a portable assembly or portable assembly structure 50 illustrated in FIGS. 6–15, for creating a quick-connect and release type of structure. It is the intention that the portable assembly 50 be modular and capable of different constructions using different combinations of the parts hereinafter described and shown to construct different types of structures, all of which use the connector 10. It is also significant that the connectors 10 and the portable assembly 50 can enable one person to erect the portable assembly in a matter of minutes.

The portable assembly 50 can include both stand-alone and supported structures. Those structures can include, by way of illustration, self-supported structures 52 such as fences, walls, and swimming pool support structures shown generally in FIG. 6, stand-alone portable structures 54 such as buildings, tents, and awnings and the like, shown generally in FIG. 7, and supported structures 56 such as awnings and the like for attachment to and support from fixed objects 58 shown generally in FIG. 8. The fixed objects 58 can include buildings, vehicles, and the like. The vehicles can include trailers, trucks, cars, recreational vehicles, tractors and the like. Those fixed objects can also have certain heights to which the portable assembly will be attached, as shown in FIG. 8, for which the supported structures 56 can be sized as described further below.

Figure 6:
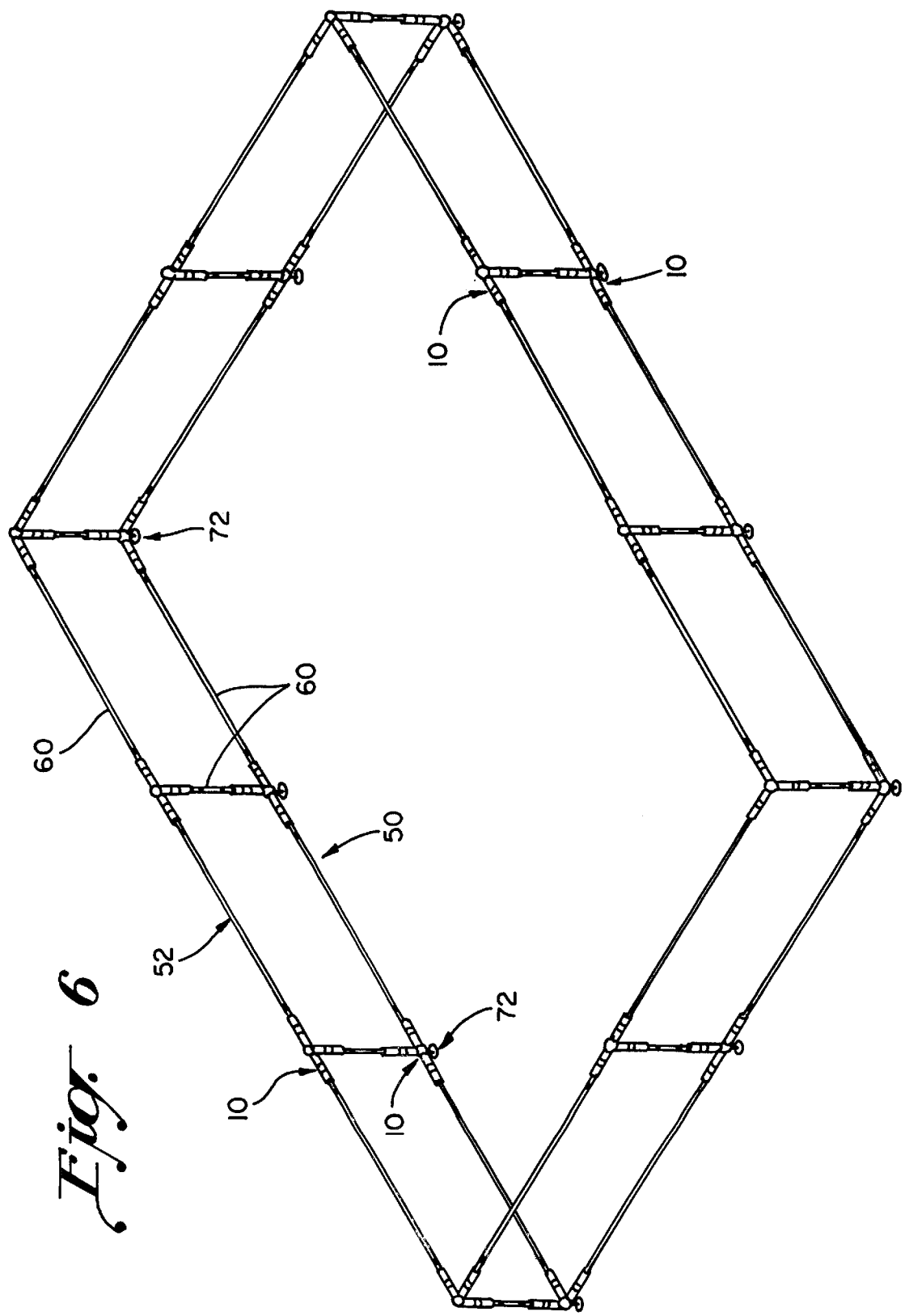
FIG. 6 is a perspective view of a first portable assembly using the coupling of the present invention.
Figure 7:
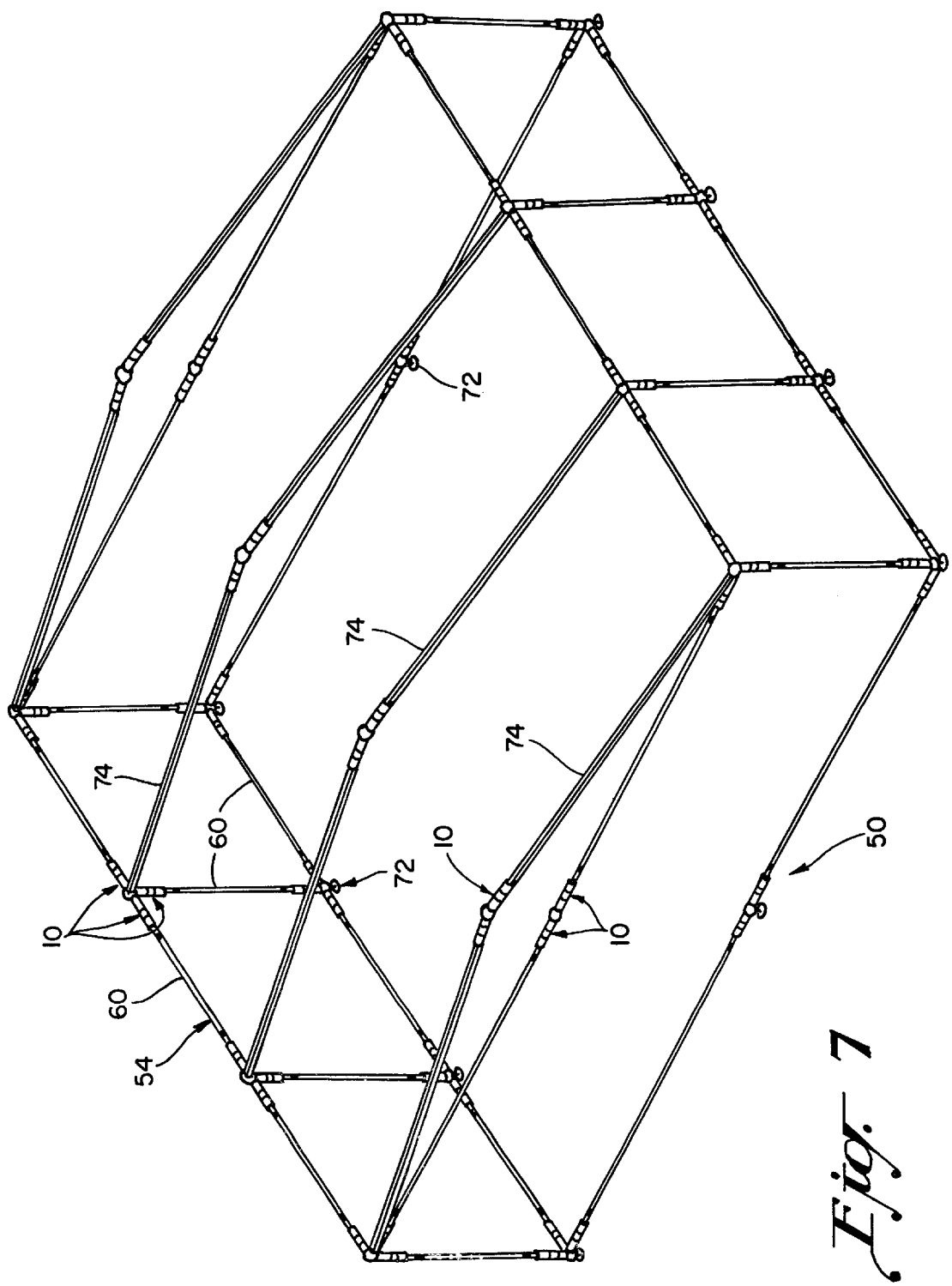
FIG. 7 is a perspective view of a second portable assembly using the coupling of the present invention.
Figure 8:
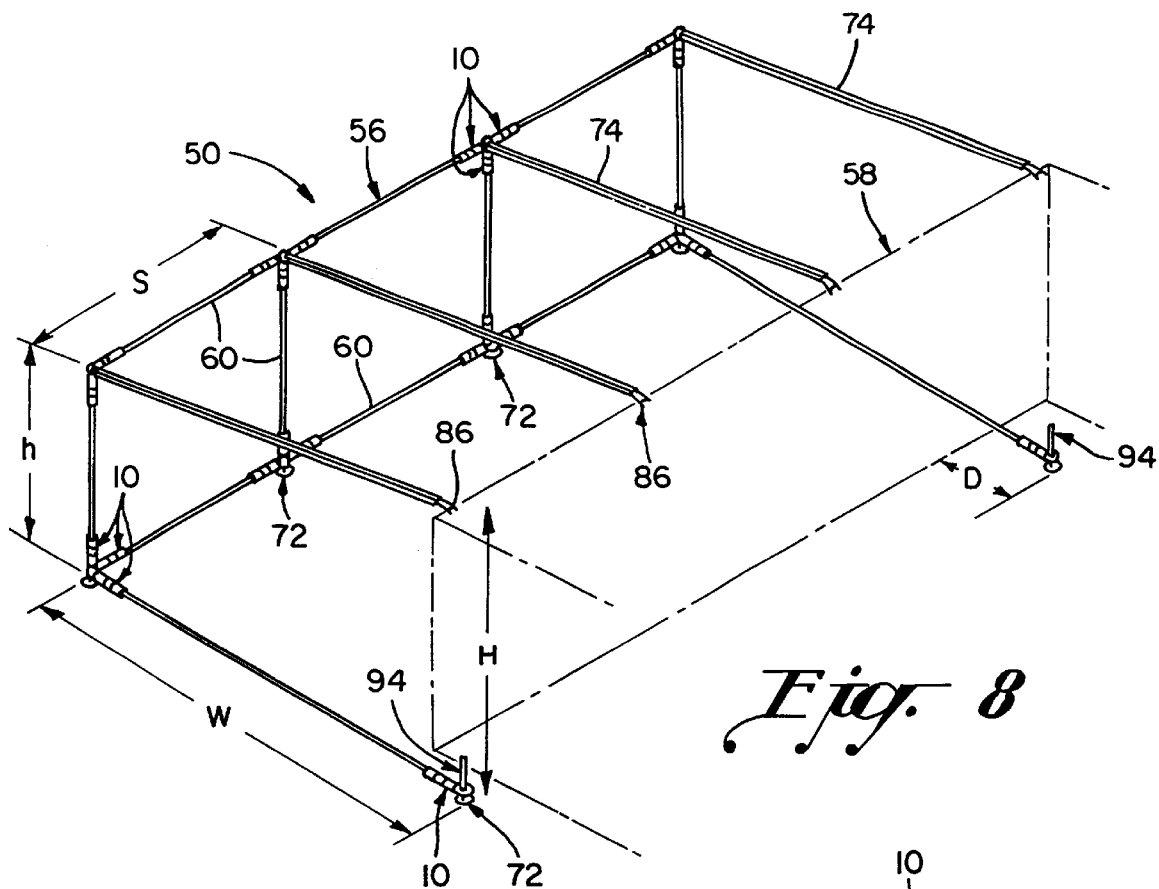
FIG. 8 is a perspective view of a third portable assembly using the coupling of the present invention.
Figure 9:
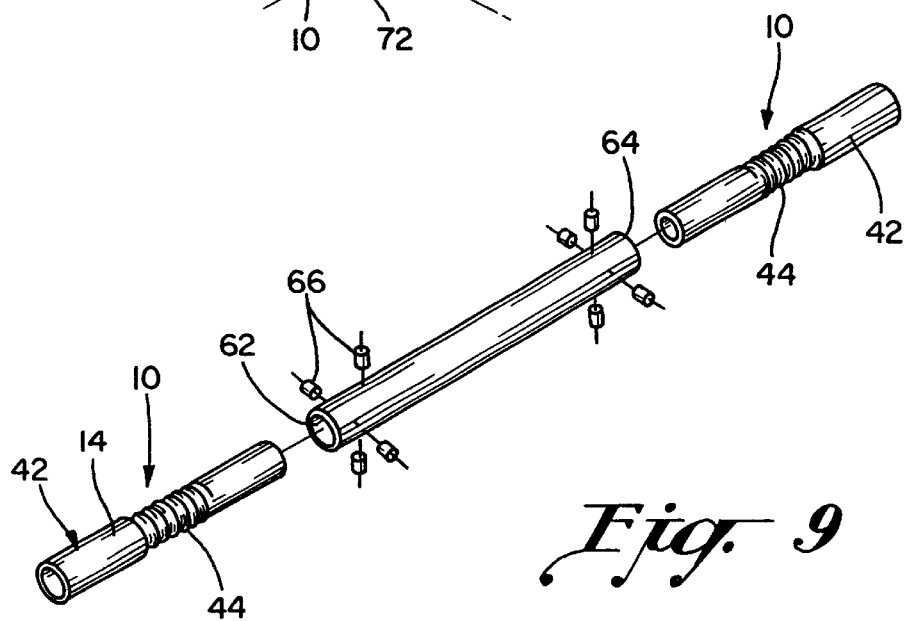
FIG. 9 is a perspective view of an elongated support member using the coupling of the present invention.

With regard to the different parts of the portable assembly 50, FIGS. 9–15 illustrate parts that can be combined together using the connectors 10 of the present invention to create the different portable assemblies 50 illustrated in FIGS. 6–8. It is noted that the illustrations show some parts usable in intermediate (i.e. middle) positions while others are used at corner positions. FIG. 9 illustrates an elongated support member 60 that comprises opposite ends 62, 64 at which the connector 10 can be attached, including its sleeve 42 and spring 44, to its first portion 14. Attachment may be made by fasteners 66. The elongated support members can be used as the horizontal, vertical, and angled support members for walls, roofs, and the like of the portable assemblies 50.

One or more elongated support members 60 may then be removably attached to one or more block support structures 68 shown in FIGS. 10–13 and 15 by means of the connectors 10. Each block support structure 68 can comprise adjacent, mutually perpendicular connection surfaces 70 or similar connection surfaces satisfying the intent of the invention. At least one connector coupling 12 can then be rotatably attached to at least one of the connection surfaces 70 for rotation along the 360-degree rotation described above. Rotatable attachment can be made using retainers 69. The rotatable attachment to the connection surface can be a permanent attachment so as to increase the strength of the portable assembly 50 as a whole. As described above, the connectors 10 of the block support structures 68 can be asymmetrically aligned with the connectors 10 of the elongated support members 60 for a strong, quick-connect connection and for constructing the portable assembly structure 50. In like manner, use of the connectors 10 provides a simple, quick disconnect mechanism for disassembling the portable assembly structure 50 as well.

Figure 12:
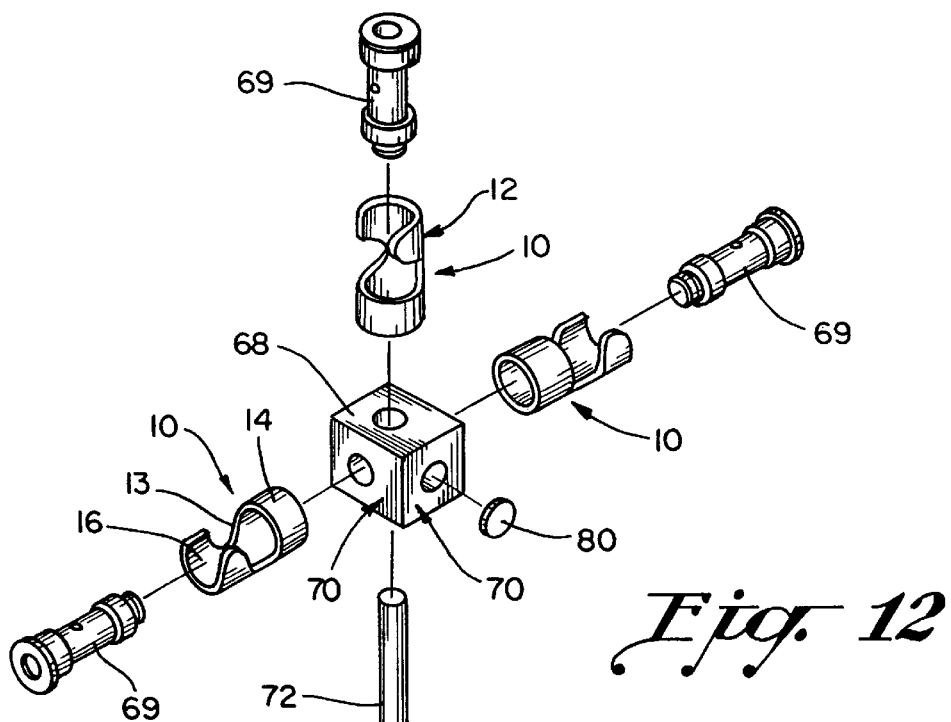
FIG. 12 is a perspective view of another block support structure and a leveling pad using the coupling of the present invention.
Figure 13:
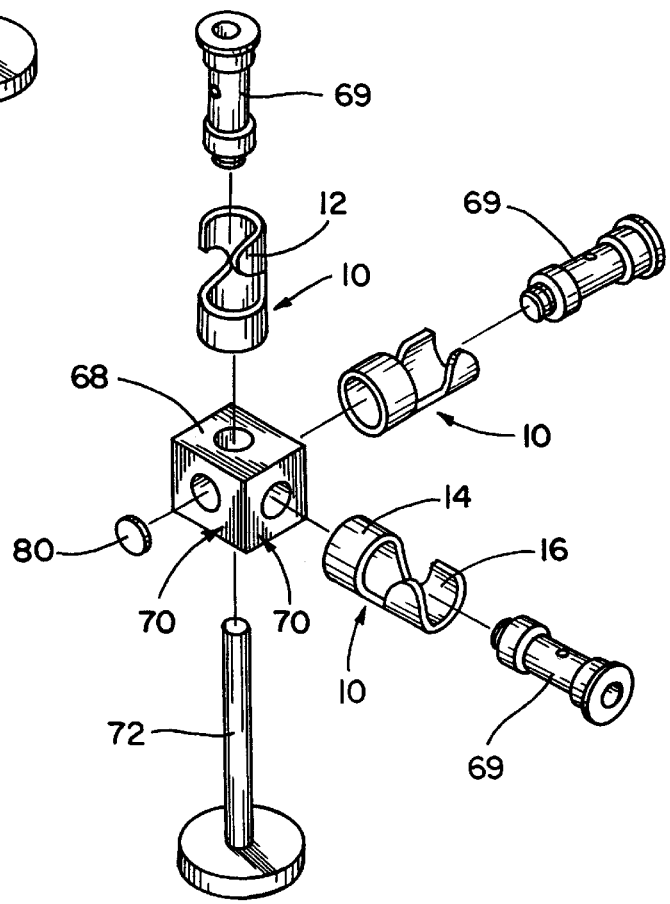
FIG. 13 is a perspective view of another block support structure and leveling pad using the coupling of the present invention.
Figure 15:
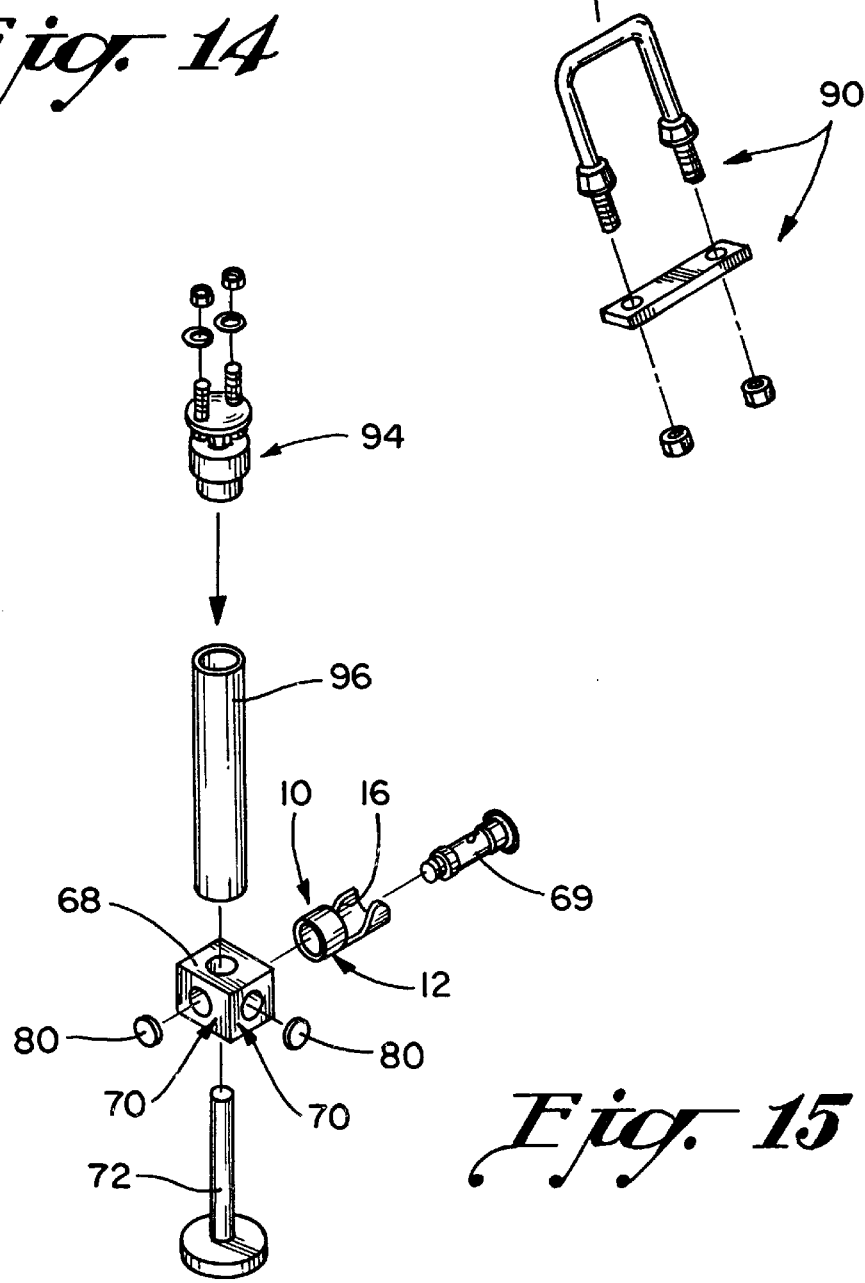
FIG. 15 is a perspective view of another block support structure and a vehicle joint and anchor support structure using the coupling of the present invention.

FIGS. 12, 13, and 15 show a leveling pad 72 attached to one of the connection surfaces 70 of the block support structures 68 for supporting and leveling the portable assembly 50. The leveling pad 72 may be used for the lower end of the portable assembly that would contact a ground surface or other surface that the portable assembly might be resting upon. This can include surfaces below the fixed objects 58.

Figure 10:
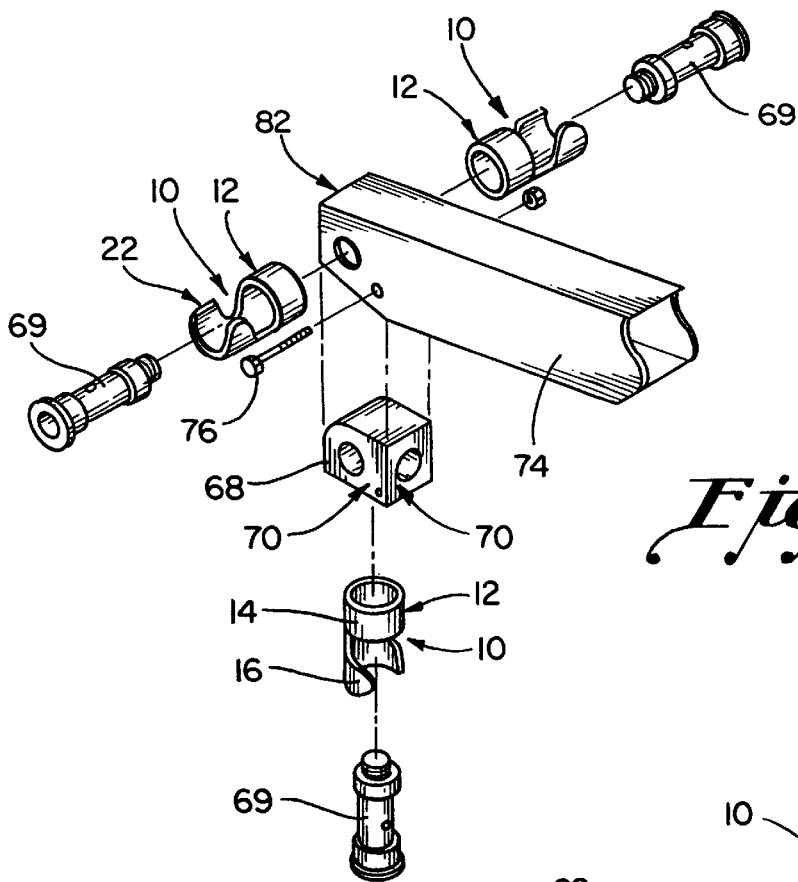
FIG. 10 is a perspective view of a beam support structure and block support structure using the coupling of the present invention.
Figure 11:
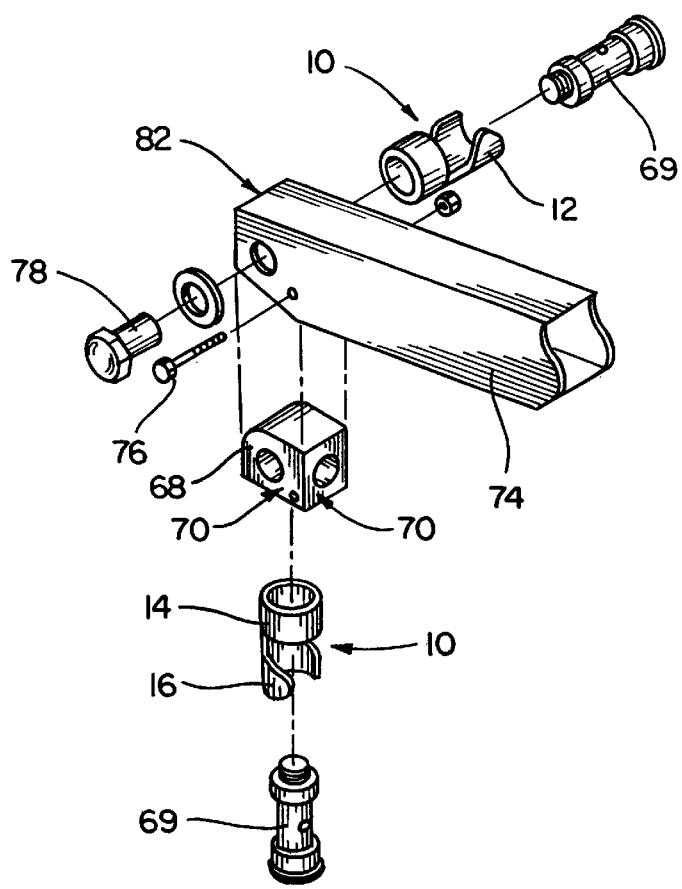
FIG. 11 is a perspective view of another beam support structure and block support structure using the coupling of the present invention.
Figure 14:
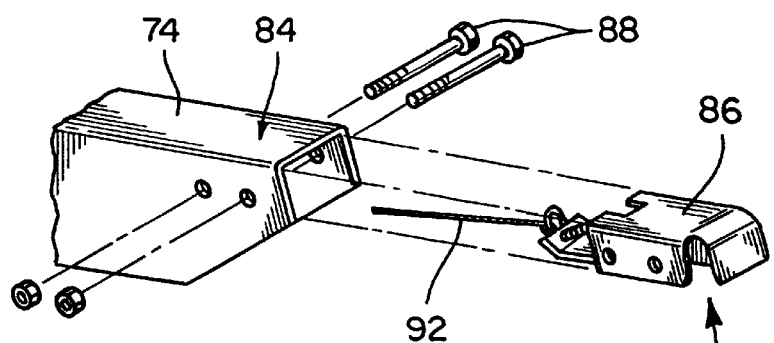
FIG. 14 is perspective view of another beam support structure and a hook connector using the coupling of the present invention.

The block support structures 68 can also include a beam support structure 74 shown in FIGS. 10, 11, and 14. The beam support structure 74 is preferably fixedly attached to one of the connection surfaces 70 using a fastener 76 secured through the beam support structure and the corresponding block support structure 68. The beam support structure can then support a roof or upper surface of the portable assembly structure 50. It is noted also that as the block support structures 68 can have more than one connection surface 70 that in cases where connectors 10 and the like are not attached to the connection surface, such as at corners of the portable assembly structure 50, that capping fasteners 78 may be attached, as is shown in FIG. 11 or dust caps 80, such as in FIGS. 12, 13, and 15.

As is illustrated in FIGS. 10, 11, and 14, the beam support structure 74 comprises opposite beam ends 82, 84 and in FIG. 14 the beam end 84 can be attached to a hook connector 86, preferably fixedly attached. Attachment to the beam end can be made using fasteners 88. The hook connector 86 can be located for removable, adjustable attachment of the portable assembly structure 50 to the fixed objects 58, such as is shown in FIG. 8. The hook connector can be attached to both the portable assembly 50 and to the fixed objects 58 using a U-shaped fastener assembly 90 shown in FIG. 14.

Moreover, the hook assembly can be attached to a cable 92 or wire and actuated from a remote location using the cable, such as when attaching the portable assembly to the hook connector that is attached to the fixed object 58 located some distance away from where the user is standing. The cable could be run through the beam support structure, the elongated support member, and so forth.

Finally, FIG. 15 shows a vehicle joint and anchor support structure 94 for attachment to at least one connection surface 70 of the block support structure 68. The vehicle joint and anchor support structure 94 can and preferably includes an anchor tubed device 96 for attachment between and of the vehicle joint and anchor support structure and the block support structure. The anchor tubed device can be sized for the particular usage according to distances between the fixed objects 58 and the surface that the portable assembly 50 will be resting upon. The vehicle joint and anchor support structure 94 can be used for supporting and attaching the portable assembly 50 to the fixed objects 58 from a separate location than the location of the hook connector 86, thereby providing added securement of the portable assembly, especially for supported structures, such as the awning. For example, the vehicle joint and anchor support structure 94 can be used for fitting underneath a trailer or vehicle.

As was stated above, the connectors 10 and the parts of the modular, portable assembly 50, including the connectors 10, can be chosen, sized, and configured according to the needs of the user as well as for the type of portable assembly 50 that will be constructed. The parts, such as the connectors can be made of standard extrusions. The preferred materials for the portable assembly 50 also include 1¼" schedule 80 Aluminum piping (i.e. for the elongated support member) and 2"×3" Aluminum rectangular tubing (i.e. for the beam support structure). It is also recommended that the connectors 10 be connected by the fasteners about 1" from the end of the elongated support structures and that chamfers be cut in the beam support structure according to the angle of the top incline of the particular portable structure constructed.

When sizing the elongated support members and the beam support structures the following calculations are recommended with reference to FIG. 8, most particularly with awning type structures. In FIG. 8, the dimensional definitions are as follows: H—the distance between the hook connector centerline and the lower block support structure centerline; h—the distance between the centerlines of the adjacent elongated support members; W—the distance between the centerlines of the vertical elongated support members and the anchor tubed device of the vehicle joint and anchor support structure; S—the distance between the centerlines of the beam support structures; and D—the horizontal distance between the hook connector and the anchor tubed device. With all calculation's dimensions in inches, the mathematical formulas for calculating the various lengths are as follows:

1. The elongated support members' length:
   1.1 Front horizontal: Lf=S−20.659
   1.2 Side horizontal: Ls W−20.659
   1.3 Vertical: Lv=h−20.659
2. Beam support structure's length:

$$Lt=\sqrt{(H-h)\times(H-h)+(W-D)\times(W-D)}+0.94$$

Also note that it is recommended that the dimensions comply within the following constraints: S≦100" and W≦175".

In construction and in use the present invention therefore provides a coupling connector that is a single universal connector that provides a quick-release connection that is both easy to engage and simple to operate. The coupling connector of the present invention also provides ease of connection without requiring perfect alignment, is structurally strong and sound, and is rotatable in a 360-degree direction for ease of connection. The coupling connector can also be inexpensive, as well as simple to manufacture, requiring only simple tooling, and can be used in the assembly of both stand-alone and supported structures.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

What is claimed is:

1. A connector comprising: a coupling comprising a first portion, a second portion adjacent the first portion, a top surface, and a bottom planar surface opposite the top surface, the bottom planar surface being continuous through the first portion and the second portion, the top surface being substantially planar through the first portion while defining a shape through the second portion that is asymmetrical in two dimensions about a set of perpendicular axes centered in the second portion.

2. The connector of claim 1, wherein the shape of the top surface through the second portion is sinusoidal.

3. The connector of claim 1, wherein the shape of the top surface through the second portion is defined as a square wave.

4. The connector of claim 1, wherein the shape of the top surface through the second portion is a raised arcuate shape.

5. The connector of claim 1, wherein one axis of the set of perpendicular axes is a longitudinal axis bisecting the first portion and the second portion and being equidistant from the top surface and the bottom planar surface of the first portion, the shape having an amplitude measured perpendicular from the longitudinal axis and having a first measurement less than a second measurement measured from the longitudinal axis to either the top surface or the bottom planar surface of the first portion.

6. The connector of claim 5, wherein the shape is defined by a mathematical function relative to the longitudinal axis, the mathematical function selected from the group consisting of sinusoidal, parabolic, and step.

7. The connector of claim 5, wherein first portion has a first thickness measured from the top surface to the bottom planar surface and the second portion has a second thickness measured from the amplitude to the bottom planar portion, the second thickness being sized and proportioned relative to the first thickness for strengthening the second portion, the second portion having a length dimension parallel the longitudinal axis being sized and proportioned relative to the first thickness for increasing axial stability.

8. The connector of claim 1, wherein the coupling has a square or round cross section measured along an axis perpendicular to both axes of the set of perpendicular axes.

9. A connection system comprising: a pair of mutually compatible couplings, each coupling comprising a first portion, a second portion adjacent the first portion, a top surface, and a bottom planar surface opposite the top surface, the bottom planar surface being continuous through the first portion and the second portion, the top surface being substantially planar through the first portion while defining a shape through the second portion that is asymmetrical in two dimensions about a set of perpendicular axes centered in the second portion, the couplings being asymmetrically aligned with one another for removably connecting the couplings.

10. The connection system of claim 9, wherein the asymmetrically aligned pair of mutually mpatible couplings are concentrically enclosed by a sleeve.

11. The connection system of claim 10, wherein the sleeve is actuated by a spring.

12. The connection system of claim 9, wherein the first portion of a first coupling of the pair of utually compatible couplings further comprises an elongated section extending opposite the econd portion of the first coupling, a sleeve concentrically enclosing the elongated section and attached to the elongated section by a spring, the sleeve for concentrically enclosing the pair of mutually compatible couplings when asymmetrically aligned with one another.

13. The connection system of claim 12, wherein the first portion of a second coupling of the pair of mutually compatible couplings is rotatably attached to a block member for attachment of the pair of mutually compatible couplings to the block member.

14. A portable assembly comprising: a plurality of elongated support members, each elongated support member comprising opposite ends and a coupling located at each of the opposite ends, each coupling comprising a first portion, a second portion adjacent the first portion, a top surface, and a bottom planar surface opposite the top surface, the bottom planar surface being continuous through the first portion and the second portion, the top surface being substantially planar through the first portion while defining a shape through the second portion that is asymmetrical in two dimensions about a set of perpendicular axes centered in the second portion, the first portion of each coupling of the elongated support members further comprising a sleeve for concentrically enclosing the first portion and the second portion, the sleeve attached to and actuated by a spring attached to the first portion; and a plurality of block support structures for removable attachment to the plurality of elongated support members, each block support structure comprising adjacent, mutually perpendicular connection surfaces and at least one coupling rotatably attached to at least one of the adjacent, mutually perpendicular connection surfaces, each coupling comprising a first portion rotatably attached to the corresponding connection surface of the block support structure, a second portion adjacent the first portion, a top surface, and a bottom planar surface opposite the top surface, the bottom planar surface being continuous through the first portion and the second portion, the top surface being substantially planar through the first portion while defining a shape through the second portion that is asymmetrical in two dimensions about a set of perpendicular axes centered in the second portion, the couplings of the plurality of elongated support members and the plurality of block support structures being asymmetrically aligned with one another for removably connecting the corresponding couplings and for constructing the portable assembly, the sleeve for concentrically enclosing the couplings.

15. The portable assembly of claim 14, wherein at least one of the block support structures further comprises a leveling pad attached to one of the adjacent, mutually perpendicular connection surfaces for supporting and leveling the portable assembly.

16. The portable assembly of claim 15, wherein at least one of the block support structures further comprises a beam support structure fixedly attached to one of the adjacent, mutually perpendicular connection surfaces, at least one of the couplings of the block support structure being rotatably attached to the corresponding adjacent, mutually perpendicular connection surface through the beam support structure.

17. The portable assembly of claim 16, wherein the portable assembly is selected from the group consisting of tents, awnings, and self-supporting building-type structures.

18. The portable assembly of claim 17, wherein the awnings are constructed for attachment to and support from buildings or vehicles, the vehicles selected from the group consisting of trailers, trucks, recreational vehicles, cars, and tractors.

19. The portable assembly of claim 16, wherein the beam support structure further comprises opposite beam ends and a hook connector, the beam support structure being fixedly attached to the corresponding block support structure at one beam end and fixedly attached to the hook connector at the opposite beam end, the hook connector being located for removably, adjustably attaching the portable assembly to a vehicle or building structure.

20. The portable assembly of claim 19, wherein at least one of the block support structures comprising the leveling pad further comprises a vehicle joint and anchor support structure attached to one of the adjacent, mutually perpendicular connection surfaces for supporting and attaching the portable assembly to the vehicle or building structure.

21. The portable assembly of claim 15, wherein the portable assembly is selected from the group consisting of walls, fences, and swimming pool support structures.

22. A method of assembling a portable structure comprising the acts of: providing a plurality of elongated support members, each elongated support member comprising at least one coupling comprising a first portion having a sleeve, a second portion adjacent the first portion, and a top surface defining a shape through the second portion that is asymmetrical in two dimensions about a set of perpendicular axes centered in the second portion, the sleeve concentrically enclosing the first portion and the second portion; providing a plurality of block support structures, each block support structure comprising at least one coupling comprising a first portion rotatably attached to the corresponding block support structure, a second portion adjacent the first portion, and a top surface defining a shape through the second portion that is asymmetrical in two dimensions about a set of perpendicular axes centered in the second portion; pulling the sleeve and compressing a spring on at least one of the elongated support members for exposing the second portion located therein; positioning the corresponding exposed second portion of the coupling of the elongated support member adjacent the second portion of the coupling of one of the block support structures; rotating the second portion of the coupling of one of the block support structures and asymmetrically aligning the second portion of the block support structure with the exposed second portion of the elongated support member; mating the asymmetrically aligned top surfaces of the couplings; releasing the sleeve for actuating and releasing the spring; and concentrically enclosing the first portion and the second portion of the corresponding elongated support member and at least the second portion of the corresponding block support structures for completion of the connection.

23. A method of assembling a portable structure comprising the acts of:

providing a plurality of elongated support members including at least one coupling and a sleeve; providing a plurality of block support structures including at least one coupling; pulling the sleeve and compressing a spring on at least one of the elongated support members for exposing a two dimensional asymmetric shaped portion of the coupling located therein; positioning the exposed two dimensional asymmetric shaped portion of the coupling of the elongated support member adjacent a substantially similar two dimensional asymmetric shaped portion of the coupling of one of the block support structures; rotating the substantially similar two dimensional asymmetric shaped portion of the coupling of the block support structure and asymmetrically aligning the substantially similar two dimensional asymmetric shaped portion of the block support structure with the exposed two dimensional asymmetric shaped portion of the elongated support member; connecting the asymmetrically aligned two-dimensional asymmetric shaped portions of the couplings; releasing the sleeve for actuating and releasing the spring; and concentrically enclosing the connected two dimensional asymmetric shaped portions of the corresponding elongated support member and at least the corresponding block support structures for completion of the connection and for assembling the portable structure.

24. The method of claim 23, further comprising re-pulling the sleeve and recompressing the spring; re-exposing the concentrically enclosed two dimensional asymmetric shaped portions of the couplings of the corresponding elongated support member and the corresponding block support structures; disconnecting the asymmetrically aligned two dimensional asymmetric shaped portions of the couplings; and releasing the sleeve for actuating and releasing the spring for re-enclosing the two-dimensional asymmetric shaped portion of the coupling of the corresponding elongated support member for disassembling the portable structure.

25. The method of claim 23, wherein connecting the asymmetrically aligned two dimensional asymmetric shaped portions of the couplings further comprises forming and assembling a wall, fence, or swimming pool support structure.

26. The method of claim 23, wherein connecting the asymmetrically aligned two dimensional asymmetric shaped portions of the couplings further comprises forming and assembling a tent, awning, or self-supporting building-type structure.

27. The method of claim 23, wherein connecting the asymmetrically aligned two dimensional asymmetric shaped portions of the couplings further comprises attaching the portable structure to a building or vehicle for forming, assembling, and securing an awning.

28. The method of claim 23, wherein concentrically enclosing the connected two dimensional asymmetric shaped portions further comprises securing the asymmetrically aligned two dimensional asymmetric shaped portions for supporting the portable structure.

29. The method of claim 23, wherein releasing the sleeve and releasing and actuating the spring further comprises securing the asymmetrically aligned two dimensional asymmetric shaped portions for supporting the portable structure.

* * * * *